(No Model.)
F. WEGMANN.
Method of Absorbing Sound, Applicable to Revolving Wheels.
No. 240,347.  Patented April 19, 1881.
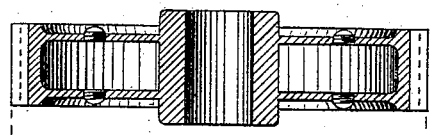
Fig. 1.
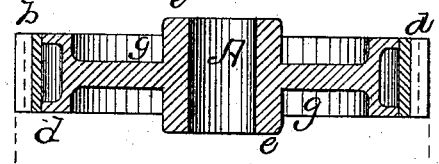
Fig. 2.
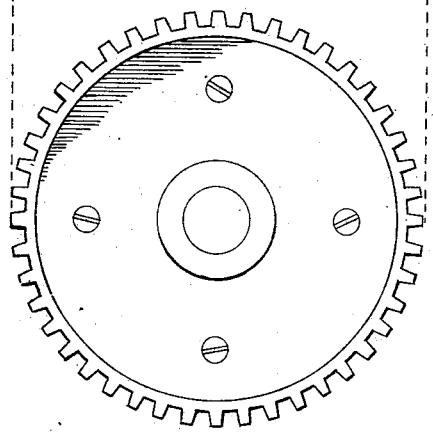
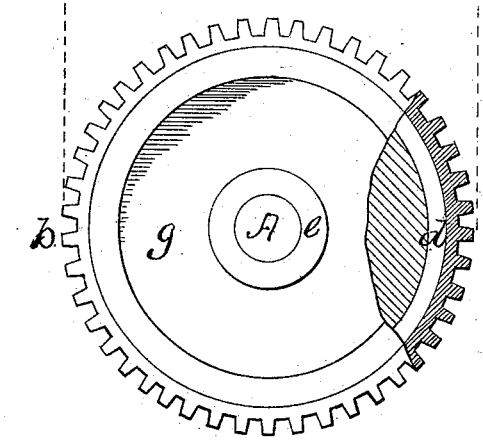
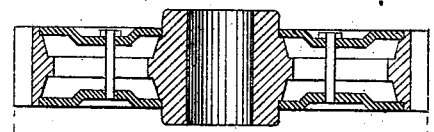
Fig. 3.
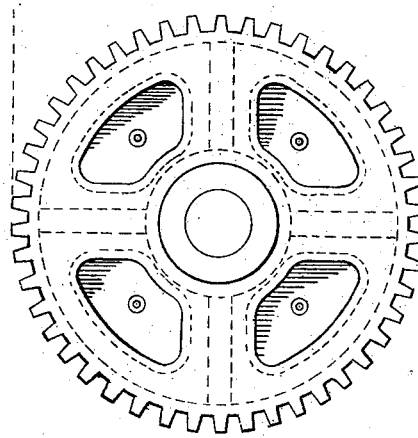
Attest:
J. C. Turner
Aug. Jordan
Inventor:
Friedrich Wegmann
By his atty
R. D. O. Smith

UNITED STATES PATENT OFFICE.

FRIEDRICH WEGMANN, OF ZURICH, SWITZERLAND.

METHOD OF ABSORBING SOUND APPLICABLE TO REVOLVING WHEELS.

SPECIFICATION forming part of Letters Patent No. 240,347, dated April 19, 1881.

Application filed December 7, 1880. (No model.)

*To all whom it may concern:*

Be it known that I, FRIEDRICH WEGMANN, a citizen of Switzerland, residing at Zurich, have invented a new and useful Method of Absorbing Sound Applicable to Revolving Wheels, (for which I have applied for Letters Patent in Great Britain, dated 29th September, 1880, No. 3,951,) of which the following is a full and exact description.

The usual noise from machinery in motion is caused by the resonant vibration of the metallic portions which are acting or working upon each other, such as cog-wheels, loose pulleys, rollers, &c. The application of elastic cushions is known to modify or neutralize these sonorous vibrations, so as to mitigate or prevent the noise; but hitherto no application of this sort has been made in connection with revolving machinery, and therefore the object of my invention is to modify or neutralize the sonorous vibrations in wheels which strike or work in contact with other parts, so as to give out sounds of all kinds, by applying elastic or non-sonorous bodies to interior parts of said wheels, to prevent the propagation of said vibrations. This effect is well known in acoustics. The deadening substance may be solid or fluid, and if solid it is preferably in comminuted form and loosely distributed.

That others may fully understand my improvement, I will particularly describe the same, having reference to the accompanying drawings.

Figures 1, 2, and 3 show, in plan and central transverse section, wheels embracing my improvement.

The wheel A may be understood to represent any description of revolving cylindrical structures which strike or work in contact with other parts so as to give out sounds. For convenience the wheel is represented with peripheral teeth or cogs. The wheel A is provided with a solid rim, $b$, and an interior annular cavity, $d$, a solid hub, $e$, and an intermediate web or set of arms, $g$, as usual. Within the annular cavity $d$ the deadening substance is placed in a free condition. I think sand is, all things considered, a preferable substance, although shot or liquids may be employed if preferred. This annular cavity may be formed in any appropriate way known to the arts, such as by a core set in the mold or by joining several plates to the wheels, as represented in Fig. 3. Three different modes of structure are shown in drawings, and others will occur to any skilled constructer.

When a wheel which is provided with an annular chamber, $d$, is charged with a movable mass or charge it distributes itself over the exterior peripheral surface of said chamber and absorbs the vibrations of the metallic parts of the wheel in contact with said mass. Another and incidental advantage is due to the automatic distribution of the charge—that is to say, the distribution of the movable mass or charge will be with reference to the center of revolution and a center of gravity coincident therewith. The wheel will be thereby balanced automatically. The charge also weights the wheel, and from that circumstance it is caused to revolve with increased steadiness.

This invention may be applied to wheels already in use or constructed by means of a hollow rim, which may be bolted to the side or within the periphery.

Having described my invention, what I claim as new is—

1. A gear-wheel, A, such as described, provided with a hollow rim or annular chamber concentric to the hub, combined with a mass of non-resonant granular substance within said chamber, free to distribute itself therein, as and for the purpose set forth.

2. The mode or method of absorbing sonorous vibrations and noise in revolving gear-wheels which strike or work in contact with other parts and give out sounds, which consists, essentially, in placing within a cavity or cavities in said wheel loose masses of solid or fluid non-resonant substances, substantially as described.

3. A gear-wheel adapted to strike or work in contact with other parts, provided with one or more cavities interior as to the rim, combined with a non-resonant substance placed loosely in said cavity or cavities and partly filling same, as set forth.

4. A gear-wheel constructed with a peripheral groove, $d$, combined with an annular rim fitted to cover and close said grooves, and a non-resonant substance placed loosely in the chamber formed by said grooves and rim and partly filling the same.

5. A cog-gear wheel provided with a hollow rim or annular chamber concentric with the hub, combined with a moving mass of non-resonant granular substance within said chamber, free to distribute itself therein, as and for the purpose set forth.

FRIEDRICH WEGMANN.

Witnesses:
FRIEDRICH SCHABELITZ,
ROBERT HOLZ.